Figure 1:
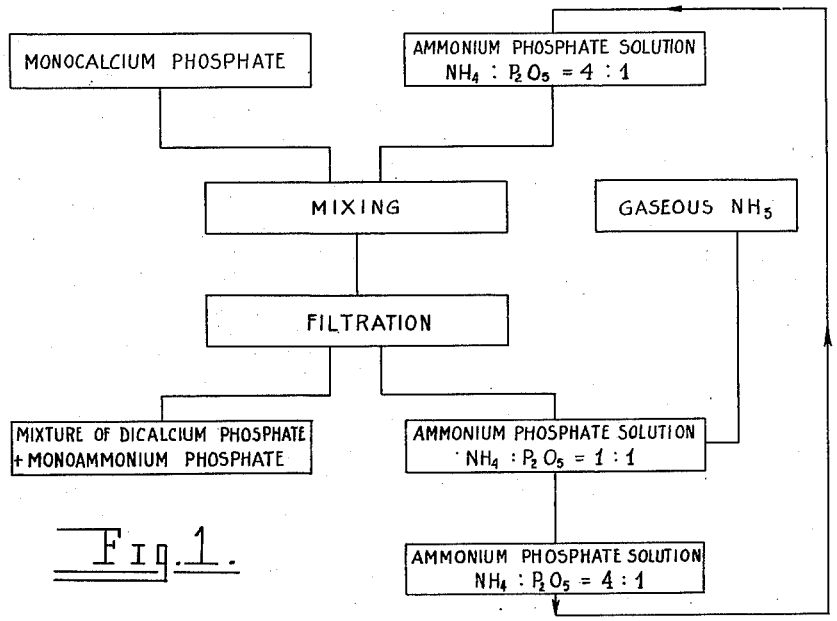

July 13, 1937. O. KASELITZ 2,086,912

PROCESS OF PRODUCING DICALCIUM PHOSPHATE AND AMMONIUM PHOSPHATE

Filed Jan. 30, 1935

INVENTOR
OSKAR KASELITZ
BY
ATTY.

Patented July 13, 1937

2,086,912

UNITED STATES PATENT OFFICE 2,086,912

PROCESS OF PRODUCING DICALCIUM PHOSPHATE AND AMMONIUM PHOSPHATE

Oskar Kaselitz, Berlin, Germany

Application January 30, 1935, Serial No. 4,081
In Germany February 14, 1934

3 Claims. (Cl. 23—107)

My invention relates to the production of dicalcium-phosphate, more especially from monocalcium-phosphate. It is an object of my invention to provide means, whereby this reaction can be brought about in a particularly effective and economical manner.

As is well-known to those skilled in the art, if monocalcium-phosphate is acted upon with free ammonia, dicalcium-phosphate and ammonium-phosphate will be formed.

I have now found that monocalcium-phosphate reacts in this manner not only with free ammonia, but also with ammonia linked to phosphoric acid, i. e. with ammonium-phosphates. I have found that even monoammonium-phosphate will react with monocalcium-phosphate under formation of dicalcium-phosphate. It is obvious that the process based on this reaction is preferable to the use of free ammonia, since now the reaction can be carried through in open vessels.

The new process can be carried through in various ways. I may, for instance, treat monocalcium-phosphate with a solution of ammonium-phosphate. In the liquor resulting in this reaction, in which the proportion of nitrogen to phosphoric acid should be kept, if possible, not below 2 mols N:1 mol. $P_2O_5$, the original proportion between the ammonia and phosphoric acid is restored by introducing ammonia and the ammonium phosphate solution can then be returned into the process, which thus becomes a cyclic process. By suitably choosing the concentration and the extent of neutralization of the solution I am enabled to separate out, besides the dicalcium-phosphate, also ammonium-phosphate. For instance, by treating monocalcium-phosphate with a solution of ammonium-phosphate saturated at ordinary temperature and containing 4 or 3 mols N:1 mol. $P_2O_5$ a mixture of solid dicalcium-phosphate and mono-ammonium-phosphate can be obtained. Preferably the monocalcium-phosphate is washed with ammonium-phosphate solutions.

Instead of proceeding in the manner above described, I may also intimately mix the phosphates of calcium and ammonium, produced according to any well-known process, in moist condition. By suitably choosing the quality and proportion of ammonium-phosphate to the monocalcium-phosphate I may produce any desired mixture of dicalcium-phosphate with my one of the different ammonium phosphates.

The reaction does not require any supply of heat from the outside, since it proceeds very quickly and completely; however, if desired, it may be carried through at a temperature above normal.

Since the chemical reaction is accompanied by a solidification of the product, this latter may advantageously be shaped or moulded during its production.

I am thus enabled to react solutions of ammonium-phosphate with super-phosphate produced in a well-known manner and being a mixture of monocalcium-phosphate and calcium sulphate, to which may be admixed other fertilizer salts. I may also subject to such treatment the so-called double super-phosphate obtained by decomposing raw phosphate with phosphoric acid.

All these mixtures containing monocalcium-phosphate react with a solution of an ammonium phosphate which contains about 3 to 4 mols $NH_3$ for 1 mol. $P_2O_5$, in such manner that the monocalcium-phosphate is converted into dicalcium-phosphate, ammonium-phosphate being formed at the same time. The phosphate solution circulating in the process, after having been separated from the solid matter, is resaturated with ammonia before being returned into the process. It is saturated with respect to the salts present in the finished product and does not change in composition, but merely brings about a transposition of the ions of the raw material to form stable salts.

The new process offers the particular advantage that in consequence of the circulation of the ammonium-phosphate solution unstable salt mixtures, which are inhomogeneous or not well storable and strewable, on being treated with the solution, are reconstructed in such manner that the conversions by chemical reaction, which otherwise occur during storage under the influence of the moisture in the air, are already brought to an end during trituration of the raw material with the solution, so that the final products are altogether homogeneous and storable. As mentioned above, the process offers the further advantage, as compared with the treatment with ammonia gas, that it can be carried through at the open air and in open vessels.

In practising my invention I may, for instance, proceed as follows:

*Example 1.*—89 parts by weight monocalcium-phosphate, which still contains the moisture adhering to it from filtration by suction, are washed with 100 parts of a diammonium-phosphate solution saturated at 20° C. and containing $4NH_4:1P_2O_5$. The moist salt mixture thus obtained is found to consist of dicalcium-phosphate and mono-ammonium-phosphate and to contain 5.89% $NH_4$ and 45.23% $P_2O_5$. The mother liquor now only contains $1NH_4:1P_2O_5$. By introducing 6.5 parts ammonia, this liquor is reconverted into a di-ammonium-phosphate solution saturated in the cold and containing $4NH_4:1P_2O_5$. This solution is returned into the process to be used in the next following operation.

Fig. 1 of the drawing affixed to this specification and forming part thereof is a flow sheet illustrating the process if carried out as above described.

*Example 2.*—To 160 parts by weight of the solution obtained in a prior operation, in which the proportion of $4NH_4:1P_2O_5$ has been restored by the introduction of ammonia gas, are added under stirring 100 parts of a freshly prepared super-phosphate containing 18.9% $P_2O_5$, to which are added 20 parts potassium chloride. The product obtained after filtration contains 7.8% $P_2O_5$ and 10.3% $K_2O$. The liquor resulting in the reaction contains $3NH_4:1P_2O_5$ and after having been treated with ammonia gas to restore to it the original proportion of $4NH_4:1P_2O_5$, is reused in cycle to treat another batch of super-phosphate and potassium chloride.

Figure 2:
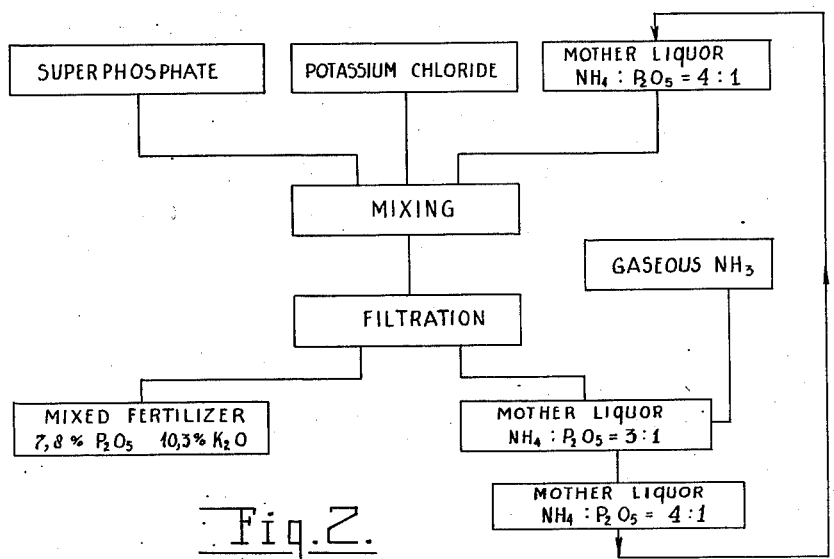

This form of the process is illustrated in the flow sheet of Fig. 2 of the drawing.

Various changes may be made in the details disclosed in the foregoing specification without departing from the invention or sacrificing the advantages thereof.

I claim:

1. The process of producing mixtures of dicalcium phosphate and ammonium phosphate which comprises adding to a mother liquor, which is a solution, obtained in the process, of ammonium-phosphate saturated at ordinary temperature and contains 3 to 4 mols N per mol. $P_2O_5$, monocalcium-phosphate in such proportion that the molar ratio of $P_2O_5:N$ in said solution does never exceed 1:2, separating the precipitated dicalcium-phosphate and ammonium-phosphate from the mother liquor, treating this mother liquor with ammonia gas to restore its original proportion of $N:P_2O_5$ and recycling this solution.

2. The process of producing mixtures of dicalcium phosphate and ammonium-phosphate which comprises adding to a mother liquor, which is a solution, obtained in the process, of ammonium-phosphate saturated at ordinary temperature and contains 3 to 4 mols N per mol. $P_2O_5$, such a proportion of a product resulting in the decomposition of a crude phosphate in the presence of sulfuric acid, that the molar ratio of $P_2O_5:N$ in said solution does never exceed 1:2, separating the precipitated dicalcium-phosphate and ammonium-phosphate from the mother liquor, treating this mother liquor with ammonia gas to restore its original proportion of $N:P_2O_5$ and recycling this solution.

3. The process of producing mixtures of dicalcium phosphate and ammonium-phosphate which comprises adding to a mother liquor, which is a solution, obtained in the process, of ammonium-phosphate saturated at ordinary temperature and containing 3 to 4 mols N per mol. $P_2O_5$, such a proportion of a product resulting in the decomposition of a crude phosphate in the presence of phosphoric acid, that the molar ratio of $P_2O_5:N$ in said solution does never exceed 1:2, separating the precipitated dicalcium-phosphate and ammonium-phosphate from the mother liquor, treating this mother liquor with ammonia gas to restore its original proportion of $N:P_2O_5$ and recycling this solution.

OSKAR KASELITZ.